July 7, 1964

S. J. HOMES 3,139,991

BARGE MOUNTED SUPPORT FOR PIPE LINE COATING MACHINE

Filed May 20, 1963

S. J. Homes
INVENTOR.

BY G C Helmig

ATTORNEY

United States Patent Office 3,139,991
Patented July 7, 1964

3,139,991
BARGE MOUNTED SUPPORT FOR PIPE LINE COATING MACHINE
Samuel J. Homes, Houston, Tex., assignor to Crutcher-Rolfs-Cummings, Inc., Houston, Tex., a corporation of Texas
Filed May 20, 1963, Ser. No. 281,595
8 Claims. (Cl. 214—1)

This invention relates to the installation of fluid conducting pipe lines and more particularly to equipment for laying submarine lines such as hollow conduits on which a protective coating is applied as a final step in paying out a continuous line from a traveling barge or other work vessel, after which the line deposits itself on bottom as the vessel moves forward on a given course and at a rate determined by time required for line preparation and assembly as well as by weather conditions and sea roughness.

An object of the invention is to minimize stress imposition and damage on laying equipment and the line being laid, by providing an adjustable suspension by which a conventional pipe treating and pay-out machine is hung on a traveling work vessel for forward and backward displacement in response to the rate of line pay-out disparity at any instant with the rate of vessel travel and which rate differential is likely to be somewhat erratic and to occur suddenly with much force with severe wave action on the vessel and on the outwardly projected and unbottomed portion of the line.

Another object of the invention is to provide for the controlled delivery of operating power to a variable speed pipe pay-out conveyor mechanism to either increase its rate upon vessel travel overrun or to decrease pay-out upon vessel underrun for compensatory balancing and harmonizing the rate of line pay-out and vessel progress.

A further object is to utilize the extent of fore and aft displacements of a freely suspended machine relative to the traveling vessel for correspondingly increasing and decreasing the machine pay-out speed toward matching coincidence with the speed of vessel travel.

A still further object of the invention is to suspend the pipe treating machine from a trolley carriage on a barge mounted and oscillatory overhead boom so that a limited range of machine movement both longitudinally and transversely of the pipe line course is accommodated by such machine suspension connection and the direction and extent of boom swing due to overrun by either the vessel or the machine relative one to the other serves as the agency for signaling a corrective modification in operating speed of line pay-out through the machine to thereby check and smooth out rate differentials.

Additional objects and advantages will become apparent from the following specification and the accompanying drawing illustrative of a preferred embodiment of the invention and in which.

Figure 1:
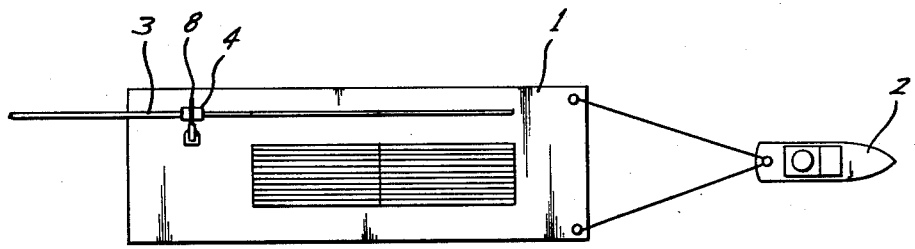
FIG. 1 is a top plan view of a work vessel on a very small scale.

In FIG. 1 a traveling work vehicle is illustrated as a marine vessel or pipe line laying barge 1 to be either self-propelled or towed by a power boat 2. On the barge deck there will be located the usual pipe storage and handling equipment for enabling long sections of conductors such as joints of pipe to be welded or otherwise connected end to end while the barge is moving forward and is continuously paying out the fabricated pipe line 3 from the stern, and for gradual and progressive submergence toward the floor of the body of water.

For surface protection, the exterior of the pipe line being payed out is treated against corrosion by cleaning and applying a sheath of coating matter, usually including a helically wound wrapping of strip material, as the pipe line passes through a coating machine 4 mounted on the barge deck and provided with pipe engageable and motor driven conveyor or traction wheels which need to be geared for running the line through the machine and outboard of the barge at a rate of speed approaching or matching but not exceeding the rate of forward barge travel. The rate of traction wheel drive in relation to forward barge travel should be related as to maintain some tension and to minimize slack in that trailing portion of the line not yet resting on bottom but without imposition of undue pull which might displace the previously bottomed line and also without unduly burdening the tow boat with the load of drawing the pipe line from the barge.

Any rate change in forward barge travel, whether because of intentional deceleration or acceleration or because of stream currents or wave action and violent tossing, pitching and rolling of the barge in a heavy sea, will upset and unbalance pipe line pay-out in relation to barge travel. To compensate automatically for such conditions, there is here disclosed an improved suspension for and control of a conventional pipe treating machine 4, shown generally as having a pipe engageable variable speed conveyor drive mechanism such as a traction wheel 5 and its connecting motor 6 preferably of the hydraulic or pressure fluid type. While this invention is concerned primarily with the traction drive mechanism for the pipe line, it is to be understood that the conventional pipe treating machine also has provision for coating and/or wrapping the exterior of the pipe and often for cleaning the pipe before coating.

For positioning the pipe treating machine 4 in alignment with the outgoing pipe line, a machine suspension connection in the form of a flexible cable 7 is secured to an overhead boom or beam 8 and extends generally in the longitudinal direction of the boom. Opposite ends of the cable are attached to the boom, as at 9 and 10, and an intermediate portion of the cable is entrained on pulleys 11–12 of a trolley carriage 13 and depends downwardly from the trolley as a vertical loop 14 in whose bight is disposed a connecting block 15 for connection with suitable suspension harness of the pipe treating machine 4. The trolley 13 tracks or rides on the beam 8 in a direction transversely to the axis of the pipe line so as to insure that the machine position will remain in longitudinal alignment with the pipe line even though there may be some sidewise displacement of the barge which supports the beam 8 or some oscillation of the beam about a vertical supporting axis, as later will be referred to.

The weight of the machine suspended by the flexible cable 7 will be transmitted into the overhead beam 8 through the trolley carriage and other connections and bearing pulleys for the cable. Such pulleys include the sheaves 16—16 at the free end of the beam 8, joining upper and lower reaches of the cable, and also a return loop engaging pulley 17 of a slack take-up and pressure fluid positioned piston 18 slidably located within a cylinder 19. Air under pressure from a suitable supply is directed to the interior of the cylinder 19 for retracting the piston 18 and the pressure of the entrapped air can be maintained by the setting of an adjustable regulator valve 20 in the delivery pipe. The load to be suspended will dictate the pressure setting of the regulator valve and the entrapped air acting on the piston constitutes an air cushion spring and normally bears the machine centrally of a permissible range of forced vertical displacement of about one foot to either side of center.

The transversely disposed boom 8 is supported near one end on top of a vertical mast or post 21 which rises upwardly from the barge deck and is securely anchored thereto at the foot of the mast. At the bearing connection for the boom, a vertical trunnion shaft 22 is secured to the boom and projects downwardly for rotation in a bearing sleeve 23 at the upper end of the mast. A dependent leg or semicylindrical skirt 24 also projects downwardly from the boom and mounts one or more antifriction rollers 25 each on a vertical axis to engage a bearing ring 26 fitted to the mast 21 intermediate its height. As will be apparent, the depending skirt 24 braces and assists in stabilizing the oscillatory cantilever I-beam or boom 8 and in transmitting the load therefrom into the supporting mast.

Fixedly secured to the mast at its upper end and coaxial with the vertical axis of boom oscillation, is a stationary sprocket 27 for a chain 28 which engages a planet sprocket 29 spaced radially from the boom swing axis and mounted on a rotary shaft 30. The shaft 30 has bearings in a pair of spaced apart brackets 31—31 which are bolted or otherwise secured to the oscillatory boom.

Figure 4:
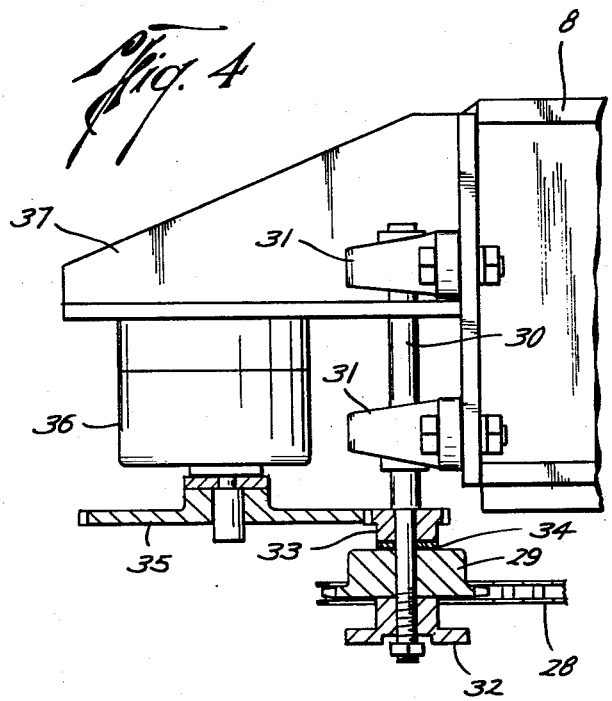
FIG. 4 is a part elevational and part sectional view of a fragment of the parts shown in FIG. 2 and on a still larger scale.

As best seen in FIG. 4, a hand nut 32 adjustably threaded on the bottom of the rotary shaft 30 clamps upwardly against the sprocket 29 which in turn bears upwardly on and clamps a gear wheel 33 against a downwardly facing shoulder on the shaft 30 whereby the sprocket and gear are clutched one to the other. Preferably, a friction disk 34 is interposed between adjoining clutch faces of the sprocket 29 and superposed gear 33 for better insuring rotation in unison. In mesh with the gear 33 is a driven gear 35 forming a part of a variable flow control valve 36 which is carried by the oscillatory boom 8 through a mounting bracket 37.

Figure 3:
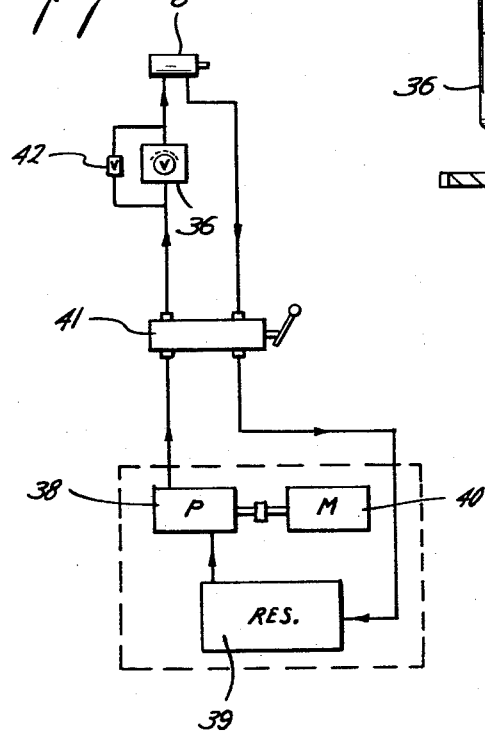
FIG. 3 is a diagram of a controlled flow circuit for supplying operating power to the line pay-out mechanism.
Figure 2:
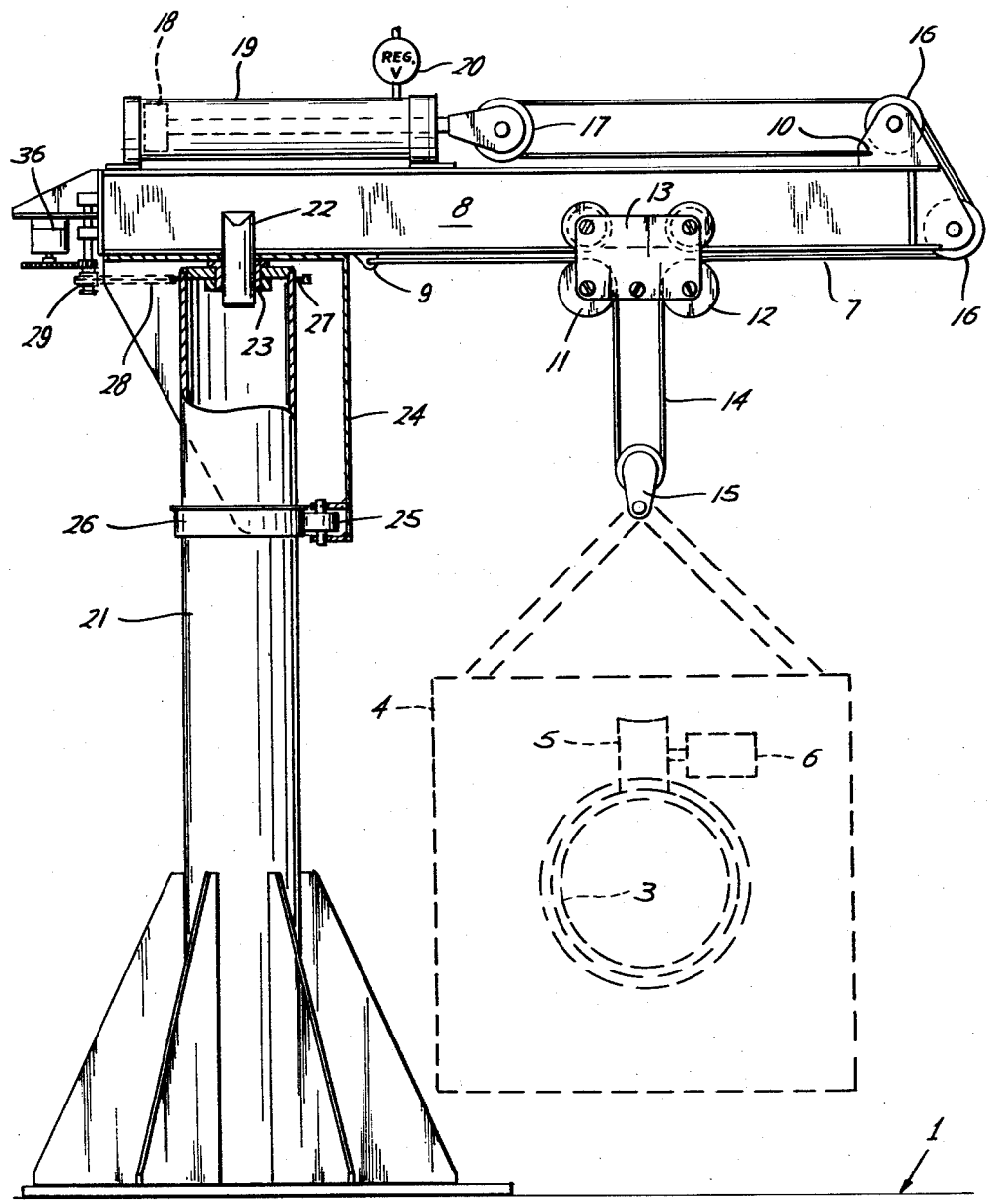
FIG. 2 is an enlarged elevation with parts in section of the suspension harness for a treating machine.

The valve 36 joins a source of pressure fluid, preferably a liquid, with the motor 6, which effects pipe line pay-out. FIG. 3 shows a hydraulic control circuit including the variable flow valve 36, a pump 38 and a liquid reservoir 39, with suitable connecting lines by which liquid is drawn from the reservoir and pumped through the valve 36 to the motor 6 and returned to the reservoir for recirculation. An electric motor 40 is provided to drive the pump 38 and a hand-operated master valve 41 is provided in the lines and can be shifted between an off-position, a forward position and a reverse position. Arrows in the diagram of FIG. 3 indicate forward flow, which would be the normal direction of rotation of the hydraulic motor 6 for paying out pipe line. Should there be occasion to reverse the direction of pay-out, this can be effected by reversing flow to and from the motor through the proper setting of the hand valve 41 and in that event, return fluid from the motor 6 back to the reservoir will bypass the variable flow valve 36 and flow through a check valve 42.

In normal operation, the variable flow valve 36 will be set after backthreading the hand nut 32 to declutch the sprocket 29 from the gear 33; the valve setting providing for a traction wheel drive and pipe line pay-out substantially corresponding with the selected travel rate of the barge and being effected while the overhead boom 8 is projected radially from its axis on a line substantially at right angles to the longitudinal axis of the pipe line and direction of barge travel. Thereupon, the sprocket wheel 29 and gear 33 can be fixed by tightening the hand nut 32 and any subsequent oscillation of the boom in either direction will carry the valve 36 so that its gear 35 will be turned through its drive train from the fixed sun sprocket 27 and either increase or decrease delivery of pressure fluid depending on the degree of boom oscillation relative to the barge carried mast. Thus, should the barge and mast move ahead somewhat faster than and overrun pipe line pay-out, the forward travel of the pipe feeding machine 4 will begin to lag behind the faster traveling mast. Such relative movement as transmitted through the suspension connection between the machine and the boom 8 at the trolley location radially spaced from the boom axis of oscillation, will pull the boom backward about its pivot mounting. The rearward swing of the boom will cause a response of the valve 36 toward an increased fluid flow to the motor 6 for stepping up the speed of pay-out and for harmonizing the rate of pay-out with that of barge travel. Similarly, if barge travel is slowed in relation to the rate of pay-out, the overrun of the line pay-out machine will be transmitted through the suspension connection and the resultant forward swinging movement of the oscillatory boom will effect a valve throttling response as required to retard pay-out speed into balance with the rate of barge travel. Should barge travel stop, and boom swing go to its forward limit, the resultant valve action can shut off traction power to the machine.

The automatic control as thus described will be especially of benefit when pipe laying operations are being conducted in other than calm waters. In other words, rough waters continuously buffeting the barge and the outboard hanging pipe line will make forward progress somewhat erratic and cause almost continuous fore and aft boom oscillation to afford balancing of barge movement and pipe line pay-out.

An over-all range of angular shift of the oscillatory boom will be held in the neighborhood of ninety degrees, to be spread forty-five degrees on either side of centralized beam projection position at right angles to barge travel. This will be adequate for all purposes and within such range of swing movement the supporting trolley carriage can ride in and out on the boom in response to and without harmful stress from transverse displacement forces on the machine and the extended length of pipe line suspended from the machine.

Disengagement of the sprocket 29 and gear 33 upon backthreading of the nut 32 will enable the boom to be swung through a complete revolution to any convenient position for initially setting up the equipment and for such adjustments or replacement of parts as may be called for from time to time.

While the foregoing has been limited to the preferred embodiment, it is to be understood that the invention is capable of variation within the scope of the appended claims.

What is claimed is:

1. For use with a traveling pipe laying vehicle, a vehicle mounted support assembly for a pipe coating machine having pipe engageable drive means controlling the feed of pipe through the machine, said support assembly comprising a machine suspension cable, a trolley therefor, a boom having a trolley guide trackway extending transversely of the feed direction of pipe through the machine, means movably mounting the boom on the vehicle to accommodate boom movement longitudinally of the direction of pipe feed and in response to changes in relative rates of vehicle travel and speed of pipe fed through the machine and means responsive to such boom movement for changing the speed of said drive means toward matching the speed of pipe feed through the coating machine with vehicle travel speed.

2. In a support assembly as in claim 1, said suspension cable extending longitudinally of the boom with one end portion anchored in fixed relation with the boom and having an intermediate loop depending from and riding on the trolley, a machine attachment block in the bight of the cable loop and a resilient load carrying device connected with the other end portion of the suspension cable.

3. For suspension by a traveling line laying vessel of a line treating machine which has a variable speed line conveyor, a vessel supported mast positioned beside the location of the machine, a boom projected laterally from and mounted by the mast for oscillation above the machine location and about a vertical axis, a machine suspension connection carried by the pivoted boom radially outwardly from its axis of oscillation and arranged to transmit relative machine and vessel movements in the direction of vessel travel and effect swing movement of the boom and means responsive to swing movement of the boom for action on the variable speed conveyor to thereby check such relative movements of the machine and the vessel.

4. In a structure as in claim 3, said machine suspension connection including a shiftable carriage mounted for free movement on the boom longitudinally thereof.

5. In a structure as in claim 4 wherein a cable extends along and has its end portions secured to the boom with an intermediate cable portion entrained on the shiftable carriage and projects therefrom as a dependent loop, a machine connection block hangs in the bight of the loop and a resilient cable tensioner acts on the cable and controls the length of said dependent loop.

6. In a structure as in claim 5 wherein said cable tensioner is adjustable in resiliency with respect to suspended load.

7. Means to harmonize the pay-out of pipe from a pipe treating machine and by the motor driven pipe engaging mechanism thereof with the travel of a pipe laying vessel on which the machine is mounted, comprising a vessel supported mast, a machine supporting boom movably mounted on the mast and accommodating machine movement longitudinally of the direction of pipe pay-out and in response to differentials in travel of the vessel and of the machine relative to pipe being paid out, means supplying motive power to the motor driven pipe engaging mechanism and an adjustable control device for the power supply means connected with the boom and responsive to positions to which the boom moves thereby to vary motive power supplied.

8. Means to harmonize the pay-out of conduit from a conduit treating machine and by the motor driven conduit engaging mechanism thereof with travel of a conduit laying vessel on which the machine is mounted, comprising a vessel supported mast structure, a machine supporting boom structure pivotally mounted on the mast structure for oscillation imparted thereto in response to differences in rates of conduit pay-out and vessel travel, a supply of pressure fluid controlling the operating rate of motor driven conduit engaging mechanism, a variable flow valve governing flow of the pressure fluid supply and being mounted on one of said structures and a motion transmitting connection joining the valve with the other of said structures for a decreased fluid flow valve setting in response to boom structure swing in the direction of conduit pay-out and for increased fluid flow valve setting in response to boom structure swing in the direction opposite to pipe pay-out.

References Cited in the file of this patent
UNITED STATES PATENTS

| | | |
|---|---|---|
| 1,931,071 | Halstead | Oct. 17, 1933 |
| 3,015,473 | Frellsen | Jan. 2, 1962 |
| 3,082,883 | Smeal | Mar. 26, 1963 |